United States Patent
Senzaki et al.

(10) Patent No.: US 6,713,591 B1
(45) Date of Patent: Mar. 30, 2004

(54) AROMATIC OLIGOMER AND USE THEREOF

(75) Inventors: Toshihide Senzaki, Kitakyushu (JP); Takahiro Imamura, Kitakyushu (JP)

(73) Assignee: Nippon Steel Chemicals Co., Ltd., Tokyo (JP)

( * ) Notice: Subject to any disclaimer, the term of this patent is extended or adjusted under 35 U.S.C. 154(b) by 51 days.

(21) Appl. No.: 10/049,517

(22) PCT Filed: Aug. 30, 2000

(86) PCT No.: PCT/JP00/05881

§ 371 (c)(1),
(2), (4) Date: Mar. 5, 2002

(87) PCT Pub. No.: WO01/16199

PCT Pub. Date: Mar. 8, 2001

(30) Foreign Application Priority Data

Aug. 31, 1999 (JP) .......................... 11/244432
Jul. 3, 2000 (JP) ....................... 2000/200630

(51) Int. Cl.$^7$ .................. C08G 14/02; C08G 8/04
(52) U.S. Cl. ................. 528/129; 528/137; 528/144; 528/159; 525/480; 525/502
(58) Field of Search ................. 528/129, 137, 528/144, 159; 525/480, 502

(56) References Cited

U.S. PATENT DOCUMENTS 4,395,498 A 7/1983 Benham

FOREIGN PATENT DOCUMENTS

| GB | 1259910 A | 1/1972 |
|----|-----------|--------|
| GB | 1259910   | 7/1972 |
| JP | 58-176210 A | 10/1983 |
| JP | 2-274714  | 11/1990 |
| JP | 4-96915 A | 3/1992 |
| JP | 4-277575 A | 10/1992 |
| JP | 4-277576 A | 10/1992 |
| JP | 4-277578 A | 10/1992 |
| JP | 6-80766 A | 3/1994 |
| JP | 11-199656 A | 7/1999 |

OTHER PUBLICATIONS

English abstract of JP 11–199656, Jul. 27, 1999.
English abstract of JP 04–277575, Oct. 2, 1992.
English abstract of JP 04–277576, Oct. 2, 1992.
English abstract of JP 04–277578, Oct. 2, 1992.
English abstract of JP 04–096915, Mar. 30, 1992.
English abstract of JP 58–176210, Oct. 15, 1983.
English abstract of JP 06–080766, Mar. 22, 1994.
English abstract of JP 02–274714, Nov. 8, 1990.

*Primary Examiner*—Duc Truong
(74) *Attorney, Agent, or Firm*—Birch, Stewart, Kolasch & Birch LLP

(57) ABSTRACT

This invention relates to an aromatic oligomer represented by the following formula (1):

$$(A—F)n—A \qquad (1)$$

wherein A is a unit comprising (a) 30–90 wt % of a bicyclic or tricyclic aromatic compound and (b) 10–70 wt % of a phenol, F is methylene or a mixture of methylene and —CH$_2$OCH$_2$— and n is a number of 1–100. The aromatic oligomer is obtained by and reaction of a polycyclic aromatic compound such as naphthalene and benzothiophene, a phenol and formaldehyde compound in the presence of an acid catalyst. The aromatic oligomer is odorless and useful for various applications. In particular, when incorporated in rubber or resin, the aromatic oligomer can perform excellently as a tackifier in a wide temperature range or perform excellently as a vibration damping agent.

4 Claims, 2 Drawing Sheets

AROMATIC OLIGOMER AND USE THEREOF

This application is the national phase under 35 U.S.C. §371 of PCT International Application No. PCT/JP00/05881 which has an International filing date of Aug. 30, 2000, which designated the United States of America.

FIELD OF TECHNOLOGY

This invention relates to aromatic oligomers and uses thereof. The aromatic oligomers of this invention are useful as tackifiers to provide adhesive properties and incorporated in resins and rubbers in formulating adhesives, pressure sensitive adhesives and coatings. Moreover, the oligomers of this invention are useful as vibration damping agents effective in the range from room temperature to about 170° C. and incorporated in resins and rubbers for use in the industrial sectors that may cause problems relating to vibration and noise such as construction materials, electrical appliances, automobiles, bridges, motors, power generators and engines.

BACKGROUND TECHNOLOGY

Resins obtained by the reaction of phenols with formaldehyde compound in the presence of an acid catalyst are well known as phenolic resins or novolak resins. Likewise, resins obtained by the reaction of aromatic hydrocarbons such as xylene with formaldehyde compound in the presence of an acid catalyst are well known as hydrocarbon resins. Indene-cumarone resins and petroleum resins are also known as hydrocarbon resins; in this case, however, indene, cumarone and cyclopentadiene themselves possess olefinic bonds and formaldehyde compound is not used in the reaction.

The use of resin obtained by the reaction of an aromatic oil with formaldehyde compound in the presence of an acid catalyst as an ingredient in formulating coatings is described in Japanese patent publication JP53-24973 B(1978). Resin compositions formulated by incorporating naphthalene, methylnaphthalene and acenaphthene in phenolic resins are described in JP59-52887 B(1984), JP07-242719 A(1995) and JP08-157571 A(1996).

Tackifiers are often added to a variety of adhesives such as hot-melt adhesives, emulsion adhesives and pressure sensitive adhesives in order to improve the adhesive strength and raise the initial adhesive strength. For example, JP10-195047 A(1998) teaches the addition of a variety of tackifier resins to acrylic emulsion adhesives. JP10-158626 A(1998) and JP06-145626 A(1994) also teach the addition of a variety of tackifier resins to hot-melt adhesives derived from SBR-based block copolymers or modifications thereof by hydrogenation or epoxidation. Furthermore, WO95-12623 teaches the addition of a variety of tackifier resins to acrylic pressure sensitive adhesives. The aforementioned patents describe a relatively large number of tackifiers in common; for example, indene-cumarone resins, petroleum resins, rosin-derived resins, xylene resins, phenolic resins, terpene resins and styrene resins. These tackifier resins are suitably chosen in consideration of such factors as compatibility with the base resin or rubber, use conditions such as temperature and presence or absence of solvents. As for their performance, there are demands for improved adhesive strength and improved initial adhesive strength and, additionaly, suppressed generation of an offensive odor at use temperature and low price in the case of hot-melt adhesives.

A number of methods have been proposed for controlling vibration damping properties by the use of petroleum resins: for example, the use of commercially available petroleum resins and cumarone-indene resins reported in JP63-11980 A(1988) and JP62-141069 A(1987) and the use of commercially available polybutenes, terpene resins or modified rosin reported in JP02-49063 A(1990). The use of alkylbenzene-methylnaphthalene resins as an example of polycyclic aromatic resins is described in JP07-90130 A(1995).

A vibration damping agent to be incorporated in a base material such as rubber, resin and bitumen to improve vibration damping properties must desirably satisfy the following properties; the loss factor (tan δ) of a vibration damping material in which the agent in question is incorporated is large in the use region and the temperature dependency of tan δ is small. It is known, however, that these properties are often contrary to each other.

An object of this invention is to provide a novel aromatic oligomer which emits little or no odor. Another object of this invention is to provide a vibration damping agent which can be readily obtained. A further object of this invention is to provide a polycyclic vibration damping agent manifesting a high degree of vibration damping performance. A still further object of this invention is to provide a vibration damping agent which manifests excellent vibration damping performance in a wide temperature range.

DISCLOSURE OF THE INVENTION

This invention relates to an aromatic oligomer which is represented by the following formula (1);

$$(A\text{---}F)n\text{---}A \qquad (1)$$

wherein A is a unit comprising (a) 30–90 wt % of an aromatic compound containing 2–4 rings and (b) 10–70 wt % of a phenol compound, F is methylene or a mixture of methylene and —CH$_2$OCH$_2$— and n is a number of 1–100.

This invention also relates to said aromatic oligomer wherein the oxygen content is 20% or less. Moreover, this invention relates to an aromatic oligomer resin which comprises said aromatic oligomer as the principal component.

Still more, this invention relates to said aromatic oligomer or said aromatic oligomer resin which is obtained by the reaction of 1 kind or 2 kinds or more of aromatic compounds selected from naphthalene, methylnaphthalene, dimethylnaphthalene, acenaphthene, fluorene, anthracene, phenanthrene, pyrene, benzothiopene and fluoranthene with 1 kind or 2 kinds or more of phenols selected from phenol and alkylphenols and 1 kind or 2 kinds or more of formaldehyde compound selected from formalin, formaldehyde and paraformaldehyde and exhibits a softening point of 50–180° C.

Also, this invention relates to a tackifier or a vibration damping agent comprising said aromatic oligomer or aromatic oligomer resin as an active ingredient.

Explanation will be given below to the method for preparing the aromatic oligomer or the aromatic oligomer resin which comprises said aromatic oligomer as the principal component and, at the same time, explanation will be given to the invention of the aromatic oligomer. It is to be noted that the aromatic oligomer to be obtained in accordance with the method of this invention is generally a mixture unless pure raw materials are used and may contain a resin which cannot be represented by general formula (1); however, the aromatic oligomer in question contains 50% or more, preferably 80% or more, of the resin represented by general formula (1) as the principal component. In this specification, % in respect to purity or concentration signifies wt % unless otherwise specified. The components in the aromatic oligomer actually mean the unit or radical derived from monomers such as an aromatic compound and a phenol existing in the oligomer; for the simplicity of explanation, however, the unit or radical present in the oligomer may often be simply described by the name of the monomer. The aromatic oligomer resin means a resin which comprises the aforementioned aromatic oligomer as the principal component, that is, in an amount of 50% or more, preferably 70% or more, more preferably 80% or more. It is to be understood here, for the simplicity of explanation, that "the aromatic oligomer" refers not only to the aromatic oligomer but also to the aromatic oligomer resin which comprises the aromatic oligomer as the principal component unless it makes a contradictory statement.

A compound useful for the aromatic compound is preferably the one that boils higher than naphthalene or a mixture of such compounds. Concretely, it is an aromatic compound consisting of an aromatic ring linked to one or more rings, the aromatic ring here being selected from 5- or 6-membered rings consisting entirely of carbon atoms, 5- or 6-membered rings consisting of one oxygen atom and carbon atoms and 5- or 6-membered rings consisting of one sulfur atom and carbon atoms, and it is preferably an aromatic compound comprising condensed 2–4 aromatic rings. The aforementioned aromatic compound may be substituted with 1–5 alkyl groups, each alkyl group containing 8carbon atoms or less.

Preferably, the aromatic compound is a polycyclic aromatic hydrocarbon; more preferably, it is naphthalene, methylnaphthalene, dimethylnaphthalene, acenaphthene, fluorene, anthracene, phenanthrene, pyrene or fluoranthene; and most preferably, it is naphthalene, methylnaphthalene or dimethylnaphthelene. In addition, benzothiophene may be cited as a preferable aromatic compound. It does not matter whether these aromatic hydrocarbons are materials of high purity or occur as the principal components in an aromatic oil such as aromatic hydrocarbon oil. Available as such aromatic hydrocarbon oil are the fractions corresponding to naphthalene oil, methylnaphthalene oil and middle oil and the intermediate products and the residual oil obtained by recovering the principal components from said fractions by such means as distillation.

The aromatic hydrocarbon oil should naturally comprise aromatic hydrocarbons as the principal components, but it may additionally contain hetero aromatic compounds having N, S, O and the like in the ring and aromatic compounds having functional groups containing such hetero atoms. Furthermore, it may contain inert aliphatic hydrocarbons. Preferably, the aromatic hydrocarbon oil contains 80% or more of bicyclic or tricyclic aromatic hydrocarbons with naphthalene or alkylnaphthalene accounting for 70% or more of said bicyclic or tricyclic aromatic hydrocarbons. The unrefined aromatic hydrocarbon oil may contain phenols and, in such a case, the phenols contained are calculated as part of the whole phenols.

Formaldehyde compound useful for this invention is adequate if it generates formaldehyde in the reaction system and formaldehyde itself, formalin and paraformaldehyde can be used, paraformaldehyde being preferred.

Phenol compound used for this invention include phenol, alkylphenols such as cresol, xylenol and tert-butylphenol, polyhydric phenols such as resorcin and pyrogallol and hydroxylated polycyclic aromatic compounds such as naphthol. Preferable from the standpoint of reactivity and properties of oligomer are monohydric phenols such as phenol and lower alkylphenols containing 6 carbon atoms or less in the alkyl group. Phenols are calculated not as the aromatic compound of this invention but as phenols.

The catalyst useful for this invention is an acid catalyst and its examples are inorganic acids such as sulfuric acid, phosphoric acid and hydrochloric acid, organic acids such as oxalic acid and toluenesulfonic acid and solid acids such as silica-alumina, zeolite, ion exchange resin and acid clay. Preferable among them are organic acids such as oxalic acid and toluenesulfonic acid. A thermally decomposable catalyst such as oxalic acid produces an extra effect that the step for its removal can be omitted.

The proportion of (a) an aromatic compound, (b) a phenol compound and (c) formaldehyde compound in use is as follows, although it varies more or less with the content of other aromatic compounds; this ratio (c)/[(a)+(b)] by mole is 0.1–0.9, preferably 0.2–0.7, more preferably 0.4–0.7, wherein the number of moles of a derivative of formaldehyde, in case it is used, is calculated as that of formaldehyde generated from the derivative and the ratio (b)/(a) by weight is 10/90–30/70–90, preferably 30/70–50/50.

Formaldehyde compound is needed to increase the molecular weight of the aromatic oligomer and to raise the conversion of naphthalene and other aromatic compounds. The use of too much formaldehyde furthers the possibility of gelatin taking place or the terminal methylol groups remaining behind in large quantities. A phenol compound not only effective increases the molecular weight of the aromatic oligomer but also performs the functions of providing suitable polarity and improving the adhesion to metallic materials; however, too much phenols causes loss of characteristics as hydrocarbon resin. An aromatic compound performs the functions of controlling adequately the polarity of the aromatic oligomer and improving the compatibility with other resins such as SBR or with solvents.

The amount used of the acid catalyst is generally 0.5–20 wt % of the reactants, although it varies with the kind of acid catalyst, and it is preferably 5–10 wt % in the case of oxalic acid.

The reaction conditions vary with the raw materials and the catalyst to be used, but generally the reaction is 50–180° C. and the reaction time is 0.5–5 hours. Formaldehyde compound, an aromatic compound and a phenol participate in the reaction and, in case the phenol is present in a small amount or absent, the product is an oligomer such as hydrocarbon resin or phenol-modified hydrocarbon resin. In case the phenol is added in a large amount, the product is an oligomer such as hydrocarbon-modified novolak resin. A solvent may be used as needed.

Upon completion of the reaction, the reaction mixture is distilled to strip off low-boiling substances such as water and formaldehyde first, then the remaining mixture is heated under reduced pressure to 200–250–300° C. to distill the unreacted raw materials and other fractions thereby leaving the aromatic oligomer as residue. When the reaction is over, the catalyst may be removed by such means as water washing if necessary and, in this case, the reaction terminates at this point. Without removal of the catalyst here, the reaction advances partly while the reaction mixture is being distilled. In case an oil containing naphthalene or methynaphthalene is used in excess as an aromatic compound, the naphthalene fraction recovered as the unreacted raw material in crystallized or washed to obtain refined naphthalene. Likewise, the methylnaphthalene fraction yields refined methylnaphthalene.

The aromatic oligomer to be obtained in this manner is the oligomer represented by the aforementioned formula (1) or the aromatic oligomer resin which comprises said aromatic oligomer as the principal component. In formula (1), A is a segment mainly comprising (a) an alkyl-substituted or alkyl-unsubstituted bicyclic or tetracyclic aromatic compound and (b) a phenol at a ratio (b)/(a) by weight of 10/90–30/70 and F is methylene or a mixture of methylene and —$CH_2OCH_2$—. Desirably, F consists of 100 mol % of methylene or 90 mol % or more, preferably 95 mol % or more, of methylene. Depending upon the use, F may contain 20–30 mol % of —$CH_2OCH_2$—.

The symbol n is a number in the range of 1–100, preferably 2–20 on an average. The number average molecular weight preferably falls in the range of 300–1,000 while the weight average molecular weight falls in the range of 500–2,000. The ratio of the latter to the former is in the range of 1.5–3. The aromatic oligomer or the aromatic oligomer resin preferably exhibits a softening point in the range of 50–180° C., preferably in the range of 70–160° C. Odor may emanate when the softening point is too low and the compatibility and adhesive property deteriorate when the softening point is too high. The aromatic oligomer resin which comprises the aromatic oligomer as the principal component is obtained when a monocyclic or tricyclic or higher compound is used as an aromatic compound in a small amount together with a bicyclic or tricyclic aromatic compound or when the reaction conditions are changed so that compounds other than the one represented by formula (1) form in a small amount.

Examination of the aromatic oligomer indicated that high-temperature treatment with oxalic acid used as a catalyst causes nearly complete escape of oxygen originating in formaldehyde compound out of the system and that the reaction carried out under milk conditions in the presence of sulfuric acid as a catalyst allows oxygen originating in formaldehyde or a derivative thereof to remain in the system. This is probably due the difference in the mode of linkage of aromatic rings, via the methylene linkage in the former vs. via the ether linkage such as —$CH_2OCH_2$— in the latter. It is desirable for the aromatic oligomer of this invention to contain 3 wt % or less, preferably 1 wt % or less, of oxygen originating in the ether linkage and 20 wt % or less, preferably 15 wt % or less, of total oxygen including oxygen originating in phenols such as alkylphenols.

The aromatic oligomer of this invention or the aromatic oligomer resin which comprises said aromatic oligomer as the principal component performs well not only as a tackifier but also as a vibration damping agent. However, in order to extract better performance as a vibration damping agent, it is preferable to design aromatic oligomers in the following manner.

Although an aromatic oligomer of this type can be obtained from an aromatic compound, a phenol and formaldehyde or a derivative thereof as reactants, a preferred raw material aromatic compound is the one mainly comprised of 1 or 2 kinds of bicyclic aromatic compounds selected from naphthalene and benzothiophene and such a raw material may be comprised of only one of naphthalene and benzothiophene, of only the two or of the two mixed with a small amount of other aromatic compounds.

The aforementioned other aromatic compounds include methylnaphthalene, dimethylnaphthalene, acenaphthene, fluorine, anthracene and phenanthrene, preferably bicyclic aromatic compounds such as methylnaphthalene and dimethylnaphthalene. An advantageous proportion of an aromatic compound and a phenol in order to obtain the resin represented by formula (1) is 30–90%, preferably 60–80%, of the sum of polycyclic aromatic compounds naphthalene and benzothiophene, 20–40% of phenols, and possibly a small amount of other aromatic compounds such as methylnaphthalene. The proportion of naphthalene and benzothiophene in the polycyclic aromatic compounds is 10–100%, preferably 30–97%, of the former and 0–100%, preferably 10–70%, of the latter.

Aromatic hydrocarbon oil containing 90% or more of naphthalene or aromatic oil containing 10% or more of benzothiophene may be either a material of high purity or aromatic hydrocarbon oil containing the two as principal components. Available as such aromatic hydrocarbon oil are fractions of coal tar corresponding to naphthalene oil, methylnaphthalene oil and middle oil, the intermediate products obtained by recovering the principal components from these fractions by such means as distillation and the residual oil.

Aromatic hydrocarbon oil containing 90% or more of naphthalene may be refined naphthalene, but a preferred example is 95% grade naphthalene which contains other components such as benzothiophene and methylnaphthalene.

Aromatic oil containing 10% or more of benzothiophene is preferably a material containing 30% or more of benzothiophene, 30% or more of aromatic hydrocarbons and 25% or more of naphthalene. A preferred example is oil formed as byproduct in refining crude naphthalene; benzothiophene is concentrated to 10–50% while naphthalene is decreased to 70–40% in the oil.

The kind and proportion of a phenol and formaldehyde or a derivative thereof are as described earlier. The same holds for the catalyst and reaction conditions. The polycyclic aromatic compounds perform the functions of improving vibration damping property, adequately controlling the polarity of aromatic oligomer and enhancing the compatibility with SBR and other resins and rubbers or with solvents.

The aromatic oligomer obtained in this manner is the aromatic oligomer represented by the aforementioned formula (1) or the aromatic oligomer resin which comprises said aromatic oligomer as the principal component. The number average molecular weight of the aromatic oligomer or the aromatic oligomer resin is preferably in the range of 300–1,000, the weight average molecular weight is in the range of 500–2,000 and the ratio of the latter to the former is in the range of 1.5–3. The aromatic oligomer or the aromatic oligomer resin desirably exhibits a softening point in the range of 50–180° C., preferably 70–160° C. In case the softening point is too low or too high, the temperature range exhibiting good vibration damping property deviates from the range in common use and the compatibility deteriorates.

PREFERRED EMBODIMENTS OF THE INVENTION

Figure 1:
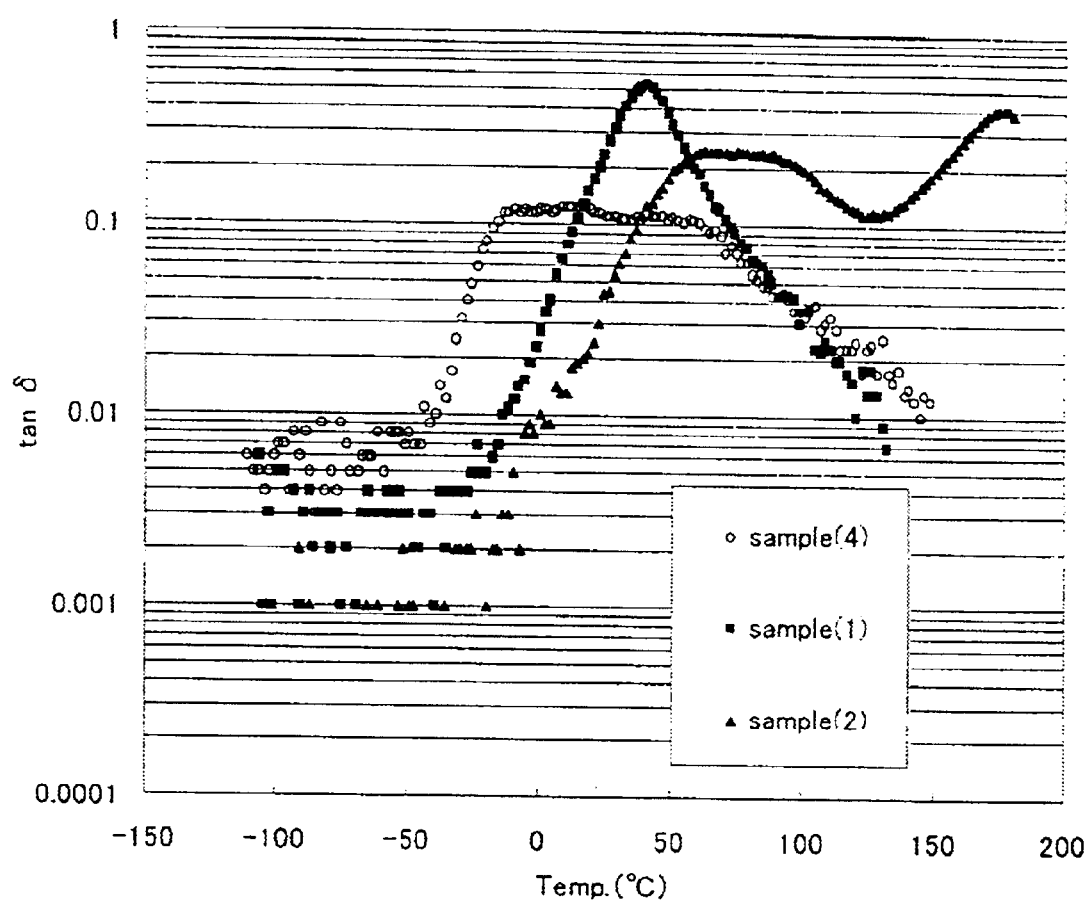
FIGS. 1 and 2 are graphs illustrating the relationship between tan δ and temperature obtained when the aromatic oligomer of this invention is used as a vibration damping agent.

The aromatic oligomer of this invention (including the aromatic oligomer resin which comprises said aromatic oligomer as the principal component) can be used as a tackifier singly or together with known tackifiers and other additives. For example, the aromatic oligomer is incorporated as a tackifier in hot-melt adhesives based on rubbers such as SBR, hot-melt adhesives based on vinyl acetate polymers and other vinyl polymers, acrylic pressure sensitive adhesives, emulsion adhesives, curing adhesives based on epoxy resins and coatings for the purpose of providing or improving adhesive property. Advantageously, it is incorporated in adhesives based on rubber such as SBR. In this case, synthetic rubber such as chloroprene and SBR, natural rubber and modifications of these rubbers by such means as hydrogenation can be used as base rubber and, in addition, stabilizers, lubricants, fillers and softeners may be incorporated in the adhesives. The proportion of the aromatic oligomer as a tackifier is 50–400 parts by weight, preferably 100–300 parts by weight, per 100 parts by weight of the base rubber or resin.

The aromatic oligomer of this invention can also be used as a vibration damping agent. In this case, the aforementioned aromatic oligomer may be used as it is or after refining or fractionation by molecular weight. The aromatic oligomer of this invention as a vibration damping agent is incorporated in a vibration damping material such as resin, rubber and bitumen. In this case, it is allowable to add, together with the vibration damping agent of this invention, other known vibration damping agents, fillers such as carbon black, calcium carbonate, titanium oxide, clay, talc, mica and alumina, process oil, antioxidants and other additives.

Advantageously, the aromatic oligomer of this invention as a vibration damping agent is incorporated in rubber such as SBR, butyl rubber, natural rubber, diene rubber, chloroprene and a modification thereof by hydrogenation or in elastic resin such as EVA (ethylene-vinyl acetate copolymer) in an amount of 10–70%, preferably 30–60%. The use of the aromatic oligomer of this invention as a vibration damping agent in plural combinations can provide good vibration damping property in a wider temperature range. When used in combination with another vibration damping agent, the aromatic oligomer of this invention can remedy the defect of the other vibration damping agent.

This invention is described below with reference to the examples in which % and part are on a weight basis.

EXAMPLE 1

In a flask were placed 134 parts of coal-based 95% naphthalene (sulfur content, 5,000 ppm), 68 parts of p-tert-butylphenol and 34 parts of 98% paraformaldehyde, the contents were kept at 110° C. and 22 parts of oxalic acid was added. The mixture was allowed to react at 130° C. with stirring for 2.5 hours to produce an oligomer. The low-boiling substances such as water formed in the reaction were refluxed. Upon completion of the reaction, a condenser was attached to the flask and the mixture was distilled at normal pressure initially. The low-boiling substances such as water and formaldehyde distilled by the time The temperature reached 200° C. Thereafter, the distillation was carried out at a reduced pressure of 100 mmHg while raising the temperature from 200° C. to 270° C. to collect a naphthalene fraction. The naphthalene fraction amounted to 100 parts and showed a purity of 99.9% or more. From the flask was obtained 120 parts of oligomer A exhibiting a softening point of 113.6° C., a number average molecular weight of 548 and a weight average molecule weight of 1,459.

EXAMPLE 2

In a flask were placed 176 parts of a mixture of coal-based methylnaphthalenes (sulfur content, 5,200 ppm), 80 parts of p-tert-butylphenol and 44 parts of 98% paraformaldehyde, the contents were kept at 110° C. and 23 parts of oxalic acid was added. The mixture was allowed to react at 130° C. with stirring for 2.5 hours to produce an oligomer. The low-boiling substances such as water formed in the reaction were refluxed. Upon completion of the reaction, a condenser was attached to the flask and the mixture was distilled at normal pressure initially. The low-boiling substances such as water and formaldehyde distilled by the time the temperature reached 200° C. Thereafter, the distillation was carried out at a reduced pressure of 100 mmHg while raising the temperature from 200° C. to 270° C. to collect a methylnaphthalene fraction which amounted to 131 parts. From the flask was obtained 139 parts of oligomer B exhibiting a softening point of 140.7° C.

EXAMPLE 3

In a flask were placed 310 parts of a coal-based mixture containing anthracene (sulfur content, 6,000 ppm), 106 parts of p-tert-butylphenol and 52 parts of 98% paraformaldehyde, the contents were kept at 110° C. and 28 parts of oxalic acid was added. The mixture was allowed to react at 130° C. with stirring for 2.5 hours to produce an oligomer. The low-boiling substances such as water formed in the reaction were refluxed. Upon completion of the reaction, a condenser was attached to the flask and the mixture was distilled at normal pressure initially. The low-boiling substances such as water and formaldehyde distilled by the time the temperature reached 200° C. Thereafter, the distillation was carried out at a reduced pressure of 100 mmHg while raising the temperature from 200° C. to 280° C. to collect an anthracene fraction which amounted to 191 parts. From the flask was obtained 235 parts of oligomer C exhibiting a softening point of 105.0° C.

As in Examples 1–3, oligomers D–H were prepared by changing the kind of aromatic compound and phenol. The results are shown in Table 1. In the table, the symbols mean the following: N, naphthalene; MN, methylnaphthalene; AN, anthracene; mixed oil, a fraction of aromatic oil containing the prefixed aromatic compound as the principal component; Ph, phenol; PTBP, para-tert-butylphenol; Mn, number average molecular weight; Mw, weight average molecular weight. The oxygen content (wt %) is obtained from elemental analysis and it is 5.4 for oligomer A in Example 1, 6.2 for oligomer B in Example 2 and 4.8 for oligomer C in Example 3.

TABLE 1

| Oligomer | Aromatic compound | Phenol | Catalyst | Mn | Mw | Softening point ° C. | Oxygen content wt |
|---|---|---|---|---|---|---|---|
| D | N | none | sulfuric acid | 407 | 993 | 75.7 | 13.0 |
| E | N | Ph | sulfuric acid | 461 | 916 | 92.6 | 5.9 |
| F | α-MN | Ph | sulfuric acid | 399 | 742 | 78.3 | 4.8 |
| G | MN mixed oil | PTBP | Oxalic acid | 654 | 1498 | 120 | 5.2 |
| H | MN mixed oil | PTBP | Oxalic acid | 499 | 1423 | 156 | 3.8 |

EXAMPLE 4

A resin composition formulated from each of oligomers A–C obtained in Examples 1–3 by adding 20% or 50% of the oligomer to SBR was inserted between two plates of SUS304 (conforming to JIS G4305) measuring 150×25×1.5 mm is such a manner as to provide an adhesive area of 10×25 mm, heated preliminarily at 175° C. for 2 minutes and pressed at 50 kgf/cm² for 1 minute to prepare a test sample. Each sample was tested for tensile shear adhesive strength with the use of Shimadzu Autograph AGS-500A. No offensive odor originating in the oligomer was perceived during the preparation of each test sample.

COMPARATIVE EXAMPLE 1

For comparison, SBR alone was tested for tensile shear adhesive strength in the same manner as in Example 1.

COMPARATIVE EXAMPLE 2

A resin composition formulated by adding 50% of commercial xylene resin (HP-120 available from Mitsubishi Gas Chemical Co., Inc.) was tested for tensile shear adhesive strength in the same manner as in Example 1.

The results are summarized in Table 2.

TABLE 2

| Oligomer | Principal aromatic compound | Adhesive strength (kgf/cm²) |
| --- | --- | --- |
| A | Naphthalene | 80 |
| B | Methylnaphthalene | 75 |
| C | Anthracene | 70 |
| none | — | 16 |
| HP-120 | xylene | 45 |

EXAMPLE 5

In a flask were placed 135 parts of coal-based crude naphthalene (naphthalene content, 96%), 68 parts of p-tert-butylphenol and 37 parts of 92% paraformaldehyde, the contents were kept at 110° C. and 23 parts of oxalic acid was added. The mixture was allowed to react at 130° C. with stirring for 2.5 hours to produce an oligomer. The low-boiling substances such as water formed in the reaction were refluxed.

Upon completion of the reaction, a condenser was attached to the flask and the mixture was distilled at normal pressure initially. The low-boiling substances such as water and formaldehyde distilled by the time the temperature reached 200° C. Thereafter, the distillation was carried out at a reduced pressure of 50 mmHg while raising the temperature from 200° C. to 270° C. to collect a fraction containing the unreacted raw materials. The fraction amounted to 66 parts. The resin remaining in the flask was an aromatic oligomer (oligomer J) amounting to 120 parts and exhibiting a softening point of 110° C.

A THF solution was prepared from a 1:1 mixture by weight of oligomer J and EVA (Evaflex 220 available from DuPont-Mitsui Polychemical Co., Ltd.). Small springs (5 mm in outer diameter and 29 mm in length) were impregnated with the solution and dried at room temperature for 24 hours to form a film in which the interstices between the springs were filled with a mixture of the resin and rubber materials. The film was used as the sample for evaluating vibration damping characteristics by DSA (Dynamic Spring Analysis).

The kinematic viscosity of sample 1 prepared in this manner was determined by a measuring instrument (RHEOBIBRON DDV-II-EP, a product of Orientec Corp.) in the temperature range of −110° C. to 150° C. and the results are shown in FIG. 1 as a plot of tan δ against temperature.

EXAMPLE 6

In a flask were placed 135 parts of the oil (containing 40% of benzothiophene and 57% of naphthalene) remaining after refining coal-based crude naphthalene by crystallization and separating refined naphthalene, 68 parts of p-tert-butylphenol and 37 parts of 92% paraformaldehyde, the contents were kept at 110° C. and 23 parts of oxalic acid was added. The mixture was allowed to react at 130° C. with stirring for 2.5 hours to produce an oligomer. The low-boiling substances such as water formed in the reaction were refluxed.

Upon completion of the reaction, a condenser was attached to the flask and the mixture was distilled at normal pressure initially. The low-boiling substances such as water and formaldehyde distilled by the time the temperature reached 200° C. Thereafter, the distillation was carried out at a reduced pressure of 50 mmHg while raising the temperature from 200° C. to 270° C. to collect a fraction containing the unreacted raw materials. The fraction amounted to 66 parts. The resin remaining in the flask was an aromatic oligomer (oligomer K) amounting to 151 parts and exhibiting a softening point of 126° C.

A 1:1 mixture by weight of oligomer K and EVA (Evaflex 220 available from Mitsui-DuPont Polychemical Co., Ltd.) was processed as in Example 1 to prepare sample 2 for evaluating the vibration damping characteristics and the kinematic viscosity was determined in the temperature range of −110° C. to 150° C. The results are shown in FIG. 1 as a plot of tan δ against temperature.

The oxygen content of aromatic oligomer J in Example 5 was 5.4 wt % and that of aromatic oligomer K in Example 6 was 4.8 wt %.

EXAMPLE 7

Figure 2:
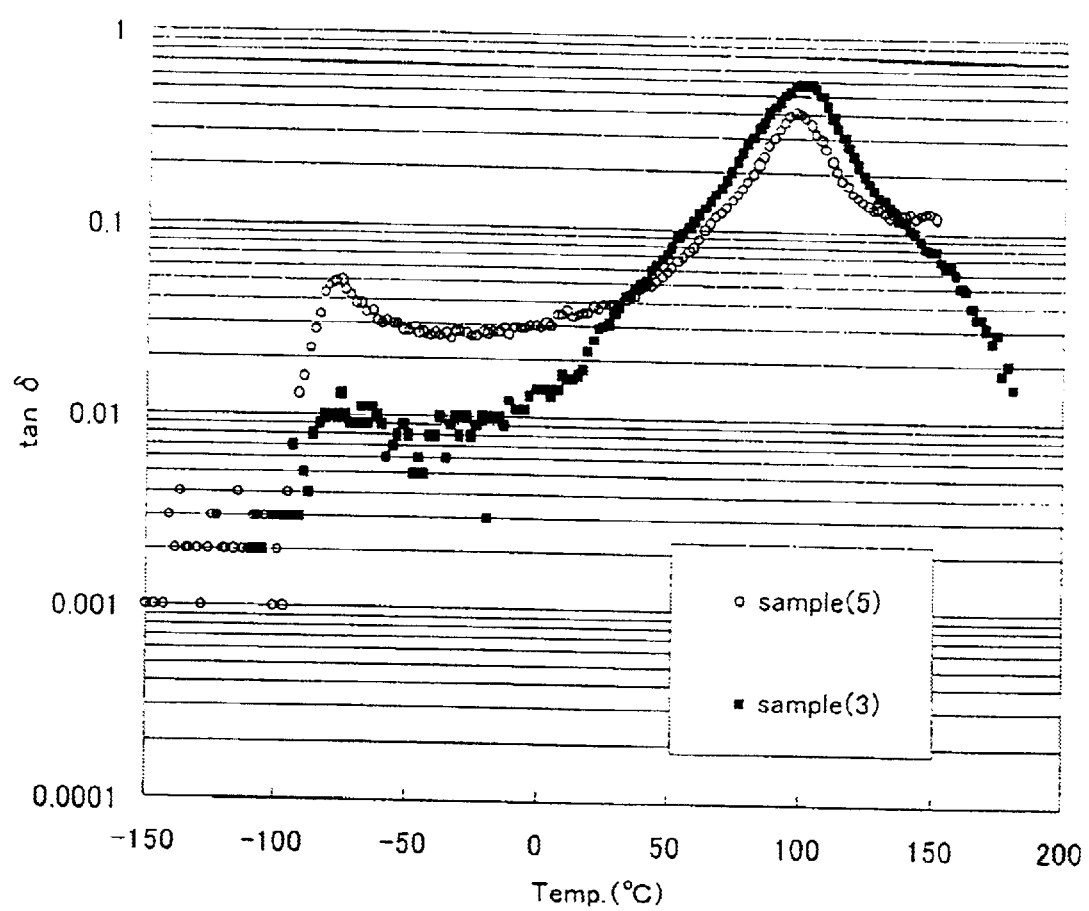

A 1:1 mixture by weight of aromatic oligomer J obtained in Example 5 and SBR (Tufprene A available from Asahi Chemical Industry Co., Ltd.) was processed as in Example 1 to prepare sample 3 for evaluating the vibration damping characteristics and the kinematic viscosity was determined in the temperature range of −110° C. to 150° C. The results are shown in FIG. 2 as a plot of tan δ against temperature.

COMPARATIVE EXAMPLE 3

Sample 4 for evaluating the vibration damping characteristics was prepared as in Example 1 except using a THF solution of EVA (Evaflex 220 available from Mitsui-DuPont Polychemical Co., Ltd.) and no aromatic oligomer and the kinematic viscosity was determined in the temperature range of −110° C. to 150° C. The results are shown in FIG. 1 as a plot of tan δ against temperature.

COMPARATIVE EXAMPLE 4

Sample 5 for evaluating the vibration damping characteristics was prepared as in Example 1 except using the THF solution of SBR (Tufprene A available from Asahi Chemical Industry Co., Ltd.) and no aromatic oligomer and the kinematic viscosity was determined in the temperature range of −110° C. to 150° C. The results are shown in FIG. 2 as a plot of tan δ against temperature.

As is shown in FIG. 1, sample 4 of Comparative Example 3 containing EVA alone exhibits a gently sloping peak of tan δ equal to 0.120 between −5.2° C. and 16.8° C. On the other hand, sample 1 containing aromatic oligomer J of Example 5 exhibits a sharp peak of tan δ equal to 0.530 at 40.6° C. and this is a proof that the sample is provided with vibration damping property.

Sample 2 containing aromatic oligomer K of Example 6 exhibits peaks of tan δ, one equal to 0.245 at 62.6° C. and another equal to 0.409 at 175° C., and the sample is expected to manifest vibration damping property in a higher temperature range.

Thus, it is possible to control the temperature range of vibration damping performance by selecting an adequate aromatic oligomer of this invention.

As shown in FIG. 2, sample 5 of Comparative Example 4 containing SBR alone exhibits a small tan δ peak equal to 0.050 at −75.4° C. and a large tan δ peak equal to 0.405 at 96.5° C.

On the other hand, sample 3 of Example 7 containing aromatic oligomer J exhibits a tan δ peak equal to 0.575 at 100.5° C. and the sample apparently shows improved vibration damping property at this temperature.

Thus, it is possible to control the temperature range of vibration damping performance by selecting an adequate polycyclic aromatic oligomer.

INDUSTRIAL APPLICABILITY

The aromatic oligomer of this invention is odorless and hence valuable in respect of use environment. It is also suitable for use as a tackifier for hot-melt adhesives. Moreover, it can give good vibration damping property. It can be prepared with relative ease. When used singly or in combination with others, it manifests good vibration damping performance in a wide temperature range.

What is claimed is:

1. An aromatic oligomer represented by the following formula (1);

$$(A-F)_n-A \qquad (1)$$

wherein A is a unit comprising (a) a bicyclic or tricyclic aromatic compound and (b) a phenol compound, F is methylene or a mixture of methylene and —$CH_2OCH_2$— and n is a number of 1–100, and the oxygen content is 20% or less.

2. An aromatic oligomer as described in claim 1 which is obtained by the reaction of one kind or two kinds or more of aromatic compounds selected from naphthalene, methylnaphthalene, dimethylnaphthalene, acenaphthalene, fluorene, anthracene, phenanthrene, pyrene, benzothiophene and fluoranthene, one kind or two kinds of more of phenols selected from phenol and alkylphenols and one kind or two kinds of more of formaldehyde compound selected from formalin, formaldehyde and paraformaldehyde and exhibits a softening point of 50–180° C.

3. A tackifier which comprises the aromatic oligomer described in claim 1 as an active ingredient.

4. A vibration damping agent which comprises the aromatic oligomer described in claim 1 as an active ingredient.

* * * * *

UNITED STATES PATENT AND TRADEMARK OFFICE
CERTIFICATE OF CORRECTION

PATENT NO. : 6,713,591 B1  Page 1 of 1
APPLICATION NO. : 10/049517
DATED : March 30, 2004
INVENTOR(S) : Toshihide Senzaki et al.

It is certified that error appears in the above-identified patent and that said Letters Patent is hereby corrected as shown below:

ON THE TITLE PAGE: Please correct the Assignee information, as follows:

(73)   Assignee:   Nippon Steel Chemical Co., Ltd.
Tokyo (JP)

Signed and Sealed this

Seventh Day of August, 2007

JON W. DUDAS
*Director of the United States Patent and Trademark Office*